(12) United States Patent
Diekmann et al.

(10) Patent No.: US 6,268,076 B1
(45) Date of Patent: Jul. 31, 2001

(54) CURRENT COLLECTOR FOR A SOFC FUEL-CELL PILE

(75) Inventors: Uwe Diekmann, Aachen; Helmut Ringel, Hambach, both of (DE)

(73) Assignee: Forschungszentrum Jülich GmbH, Jülich (DE)

( * ) Notice: Subject to any disclaimer, the term of this patent is extended or adjusted under 35 U.S.C. 154(b) by 0 days.

(21) Appl. No.: 09/374,823

(22) Filed: Aug. 13, 1999

Related U.S. Application Data

(63) Continuation-in-part of application No. PCT/EP98/00662, filed on Feb. 6, 1998.

(30) Foreign Application Priority Data

Feb. 15, 1997 (DE) .................................................. 19705874

(51) Int. Cl.⁷ .............................. H01M 8/02; H01M 8/12
(52) U.S. Cl. .................................. 429/30; 429/34; 429/40
(58) Field of Search .................................. 429/30, 34, 41, 429/40

(56) References Cited

U.S. PATENT DOCUMENTS 5,338,621  8/1994  Bossel .

FOREIGN PATENT DOCUMENTS

| 4 016 157 A1 | 12/1990 | (DE) . |
| 42 27 603 | * 5/1994 | (DE) . |
| 195 32 791 A1 | 12/1996 | (DE) . |
| 195 34 047 C1 | 12/1996 | (DE) . |
| 0 432 381 A1 | 6/1991 | (EP) . |
| 0 446 680 A1 | 9/1991 | (EP) . |
| 6-264193 | 9/1994 | (JP) . |
| 7-145454 | 6/1995 | (JP) . |
| WO 92/16029 | 9/1992 | (WO) . |

OTHER PUBLICATIONS

Patent Abstracts of Japan, vol. 095, No. 009, Oct. 31, 1995 of JP 07 145454 (Sumitomo Special Metals Co., Ltd.), Jun. 6, 1995 and Database WPI, Derwent Publications Ltd., London, GB; AN 95–237398, XP002067926.

Patent Abstracts of Japan, vol. 018, No. 668 (C–1289), Dec. 16, 1994 of JP 06 264193 (Sumitomo Metal Ind. Ltd.), Sep. 20, 1994, and Database WPI, Derwent Publications Ltd., London, GB; AN 94–338638, XP002067927.

Patent Abstracts of Japan, vol. 015, No. 118 (E–1048), Mar. 22, 1991 of JP 03 008264 (Sanyo Electric Co. Ltd.), Jan. 16, 1991.

Chemical Abstracts, vol. 127, No. 2, Jul. 14, 1997, Columbus, Ohio, US; Abstract No. 20908, Fujita, Yoji: "Molten carbonate fuel cells", XP002068067 of JP 09 092 306 (Mitsubishi Electric Corp.) Apr. 4, 1997.

* cited by examiner

*Primary Examiner*—Stephen Kalafut
*Assistant Examiner*—Jonathan Crepeau
(74) *Attorney, Agent, or Firm*—Frishauf, Holtz, Goodman, Langer & Chick, P.C.

(57) ABSTRACT

A current collector for a SOFC fuel-cell pile including a base body made from a first heat-resistant ferrite alloy which contains chromium and aluminum and has an aluminum content of more than 2 wt %, the base body defining guide ducts for feeding fuels, and at least one contact element made from a second heat-resistant ferrite alloy which contains chromium and has an aluminum content of less than 2 wt %, the at least one contact element being fastened facing away from the base body at the end of a ridge of the base body, which bounds a side wall of a guide duct. In a fuel cell provided with electrodes and the current collector, the volatilization of chromium oxides is largely suppressed, while adequate electrical conductivity of the contact points between the current collector and the electrodes are simultaneously ensured.

19 Claims, 1 Drawing Sheet

CURRENT COLLECTOR FOR A SOFC FUEL-CELL PILE

This application is a continuation-in-part application of International Application No. PCT/EP98/00662 filed Feb. 6, 1998, the entire contents of which are incorporated by reference herein.

BACKGROUND OF THE INVENTION

1. Field of the Invention

The present invention relates to a current collector for SOFC fuel-cell piles.

2. Background Information

A fuel-cell pile is provided with a plurality of fuel cells as essential components. A fuel cell in turn comprises a cathode, an electrolyte and an anode. An oxidizing agent such as air is supplied to the cathode and a fuel such as hydrogen to the anode. Both fuel and oxidizing agent are referred to in general as process materials hereinafter.

Various types of fuel cells exist. An example is the SOFC fuel cell, which is also known as the high-temperature fuel cell, since its operating temperature can be as high as 1000° C.

At the cathode of a high-temperature fuel cell, oxygen ions are formed in the presence of the oxidizing agent. The oxygen ions pass through the electrolyte to the anode side, where they recombine with hydrogen from the fuel to form water. The recombination reaction releases electrons and thereby generates electrical energy.

A SOFC fuel cell contains a solid electrolyte, which conducts the $O^{2-}$ ions but not electrons. Yttria-stabilized zirconia (YSZ) is usually used as material for the solid electrolyte.

Large powers are achieved by stacking a plurality of fuel cells together and connecting them electrically in series. The element which connects two fuel cells is known as an interconnector. It provides both electrical and mechanical coupling of two fuel cells. The connecting element is also used to form the cathode or anode chambers. A cathode chamber contains a cathode and an anode chamber. Such stacked fuel cells are known as fuel-cell piles.

From the prior art there is known an interconnector made from ceramic material, for example lanthanum chromite ($LaCrO_3$). This interconnector indeed exhibits suitable electrical conductivity at high temperatures and can also be readily matched to the thermal expansion behavior of the cell material of the fuel-cell pile. The ceramic material is very expensive, however, in addition to which production of interconnectors therefrom is a complex process. Thereby high manufacturing costs are also incurred.

Another interconnector known from the prior art is made from a metallic material. For this purpose a heat-resistant ferritic alloy such as $Cr5Fe1Y_2O_3$ is preferably used. $Cr5Fe1Y_2O_3$ is a mechanical alloyed alloy which is 99% metallic and is a powder metallurgical ("PM") alloy. $Cr5Fe1Y_2O_3$ is produced using powders, high-energy milling and sintering. $Cr5Fe1Y_2O_3$ contains 94% chromium, 5% iron and 1% $Y_2O_3$. $Cr5Fe1Y_2O_3$ serves to improve certain properties, such as fatigue and corrosion resistance. Because of the high operating temperatures in combination with high $O_2$ partial pressure on the cathode side, an oxide layer is formed on the metallic interconnector material.

This oxide layer must now satisfy stringent requirements of high temperature stability and conductivity. In the prior art, these requirements are met only by chromium oxide layers. These in turn suffer from the disadvantage, however, that the cathode in particular becomes damaged by volatilization of chromium oxides under the given high-temperature operating conditions. For this reason, the prior art provides for coating the cathode side with a special full-surface barrier layer, of $LaCrO_3$, for example, in order to prevent volatilization of the chromium oxides.

It is also known from the prior art that, by addition of aluminum, the alloy forms a cover layer of $Al_2O_3$. This cover layer in turn is more stable than the chromium oxide cover layer, but the cover layer of $Al_2O_3$ has only vanishingly low electrical conductivity.

SUMMARY OF THE INVENTION

The goal of the present invention is therefore to provide a current collector in which the volatilization of chromium oxides is largely suppressed, while adequate electrical conductivity of the contact points between a current collector and the electrodes is simultaneously ensured.

The goal is solved by the current collector of the present invention. According to the present invention, it has been found that the requirements of conductivity of the oxide layer must be met only in the zone of the contact elements which make electrical contact. In contrast, the reverse requirements apply to the oxide layer in the zones of the remaining surface, where electrical conductivity is not particularly important, but instead the surface must be as stable as possible.

It is therefore proposed that only the alloy of the contact elements have an aluminum content of less than 2.0 wt %. Thereby it is advantageously ensured that an $Al_2O_3$ layer will be formed to only a very small extent at the surface of the contact element, and thus will not impair electrical contact with one of the cathodes of the fuel cell. In contrast, the alloy of the remaining base body of the interconnector has an aluminum content of more than 2.0 wt %, and so an $Al_2O_3$ layer is always formed on the surface of the base body.

This $Al_2O_3$ layer is stable toward the atmosphere around it and ensures that escape of chromium oxides from the interconnector is nonexistent or very slight. Not the least consequence thereof is that the stability of the electrodes of the fuel cell is improved.

The present invention thus concerns a current collector for a SOFC fuel-cell pile including a base body made from a first heat resistant ferrite alloy which contains chromium and aluminum and has an aluminum content of more than 2 wt % and at least one contact element made from a second heat-resistant ferrite alloy which contains chromium and has an aluminum content of less than 2 wt % (which can be 0 wt %), wherein the base body defines guide ducts for feeding fuels and the at least one contact element is fastened facing away from the base body at the end of a ridge of the base body which bounds a side wall of a guide duct.

Examples of the first heat-resistant ferrite alloy include X8 CrAl 20-5; X8 CrAl 25-5; and X8 CrAl 14-4.

Examples of the second heat-resistant ferrite alloy include X10 CrAlSi 18; X10 CrAlSi 24; X10 CrAlSi 13; and X7 CrTi 12.

The meaning of the following different terms in the above described alloys are according to the DIN, which is the German Normalization Standard:

X8, X10, X7: the "X" means that the material is a steel alloy and the number following the "X" is the carbon content in 1/100 percent. So X8, for example, is a steel with a nominal carbon content of 0.08 percent.

X8 CrAl 20-5 is an alloy steel containing 0.08 percent carbon, 20 percent chromium and 5 percent aluminum.

X8 CrAlSi 18 an alloy steel containing 0.08 percent carbon, 18 percent chromium and a certain low amount of Al and Si (about 1 percent).

X7 CrTi 12 is an alloy steel containing 0.07 percent carbon, 12 percent chromium and a certain low amount of Ti (about 1 percent).

Preferably the alloy of the contact element has an aluminum content of less than 1.5 or 1.0 wt %. This follows from the knowledge that the tendency of the alloy to form an $Al_2O_3$ layer decreases as the aluminum content becomes smaller. Below 1.0 wt %, it can be assumed that an $Al_2O_3$ layer will no longer be formed on the surface of the alloy.

Preferably the alloys comprise a heat-resistant ferritic alloy, which can be matched appropriately to the thermal expansion behavior of the other materials of the fuel-cell pile, and which also ensure suitable shape stability, so that mechanical integrity of the fuel-cell pile can be guaranteed.

In a further preferred embodiment, the contact elements are bonded to the base body of the current collector by means of coalesced materials. Welding, weld surfacing or brazing are examples suitable for this purpose. The bonded zone then advantageously contains barrier layers, which suppress inter diffusion of aluminum between the alloys.

A fuel-cell pile can now be constructed with the current collector described hereinabove. As also described hereinabove, such a current collector can be used not only for feeding the fuels for the fuel cells, but also for conducting the current generated by the fuel cells.

When the fuel-cell pile has been assembled, therefore, the contact elements of a current collector are substantially completely in electrically conducting contact with an electrode of a fuel cell. Since the contact element, by virtue of the required electrical conductivity, has only a low aluminum content, a chromium oxide layer is formed on the surface of the contact elements. Chromium oxides escape from this layer and thus lead to contamination and possibly even to destruction of the cathodes. This phenomenon cannot be prevented even by the higher aluminum content that is otherwise present in the base body and by the protection that it imparts against the escape of chromium oxides.

Thus the point at which the contact elements of the current collector make contact with the electrode is preferably enclosed by an envelope. This protects the contact element from the ambient atmosphere, and so harmful chromium oxides cannot escape from the surface. Furthermore, the insulation preferably comprises an electrically conducting ceramic such as lanthanum chromite ($LaCrO_3$)

The advantages of the current collector design according to the present invention are that, in the first place, no insulating intermediate layers are formed despite the use of a current collector material with high aluminum content, since at the critical positions contact is made by an alloy with low aluminum content.

In addition, high-temperature stability of the current collector is achieved by the use of aluminum, which is an inexpensive alloying element, in contents of substantially between 1.0 and 6.0 wt %.

Finally, volatilization of chromium oxides can occur only at the contact elements of the current collector, since the base body is enclosed by an impervious aluminum oxide layer. The danger of local volatilization of chromium oxide at the contact elements can be reduced effectively, however, by a surrounding contact layer.

BRIEF DESCRIPTION OF THE INVENTION

The invention will be explained in more detail hereinafter on the basis of a practical example with reference to the drawings.

DETAILED DESCRIPTION OF THE INVENTION

Figure 1:
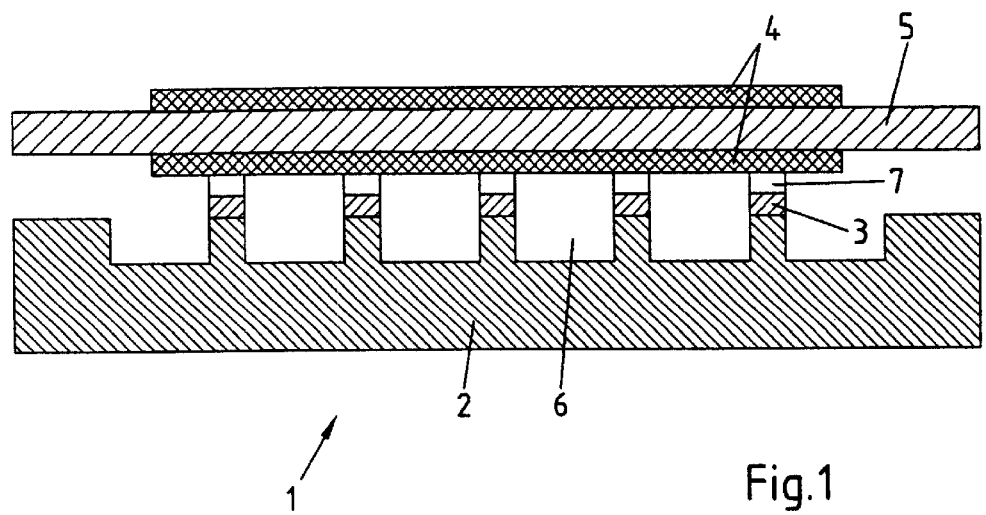
FIG. 1 shows a cross section through an interconnector which is connected to a fuel cell.

FIG. 1 illustrates a current collector 1 according to the present invention, which is provided with a base body 2 and a plurality of contact elements 3. Contact elements 3 are disposed in a direction facing away from base body 2, in order to be able to make appropriate contact with an electrode 4 of a fuel cell 5. Thereby guide ducts 6 for feeding fuels are also defined.

According to the present invention the alloy of base body 2, or in other words the first alloy, has an aluminum content of more than 2.0 wt %. Thereby it is ensured that an $Al_2O_3$ layer will be formed on the surface of base body 2, thus preventing volatilization of chromium oxides.

In addition, the alloy of contact element 3, or in other words the second alloy, has an aluminum content of less than 2.0 wt %, especially less than 1.5 wt % and preferably less than 1.0 wt %. Thus an electrically insulating $Al_2O_3$ layer is not formed at the surface of contact element 3, and so chromium oxides can in principle escape or volatilize at contact elements 3. This volatilization is considerably smaller, however, than in a current collector which is made completely from an alloy which releases chromium oxides.

The alloys of both base body 2 and of contact element 3 are preferably heat-resistant ferritic alloys.

Furthermore, contact elements 3 of the practical example illustrated in FIG. 1 are bonded to base body 2 of the current collector 1 by means of weld surfacing. Thus a bond comprising coalesced materials is formed between contact element 3 and base body 2.

As illustrated in FIG. 1, contact elements 3 are connected to electrode 4 of fuel cell 5 by means of a contact layer 7, in order to ensure connection with adequate electrical conductivity even at various high temperatures. In this case contact layer 7 covers the surface of contact element 3 from one side. Thus only the side walls of contact element 3 are exposed to the ambient atmosphere, into which chromium oxides may be released.

Figure 2:
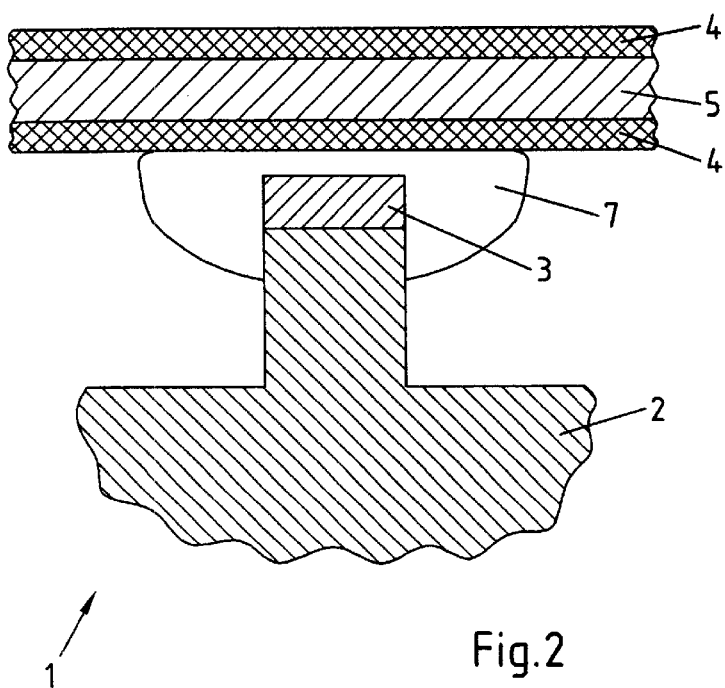
FIG. 2 shows a cross section through the point at which the contact element makes contact with an electrode of a fuel cell.

FIG. 2 illustrates a further embodiment of the connection between contact elements 3 and electrode 4. In this case contact layer 7 encloses contact element 3 on all sides, and so no part of the surface of contact element 3 is exposed to the ambient atmosphere. In this case, therefore, it is effectively ensured that chromium oxides cannot be released from contact element 3, which has only a low aluminum content.

What is claimed is:
1. A current collector for a SOFC fuel-cell pile comprising
   a base body defining guide ducts for feeding fuels, the base body being made from a first heat-resistant ferrite alloy which contains chromium and aluminum, the first heat-resistant ferrite alloy having a aluminum content of more than 2 wt % and
   at least one contact element made from a second heat-resistant ferrite alloy which contains chromium, the contact element being bonded to the base body by a coalesced material, the at least one contact element being fastened facing away from the base body at the end of a ridge of the base body which bounds a side wall of a guide duct, the second heat resistant ferrite alloy having an aluminum content of less than 2 wt %.

2. The current collector according to claim 1, wherein the second heat-resistant ferrite alloy has an aluminum content of less than 1.5 wt %.

3. The current collector according to claim 1, wherein the second heat-resistant ferrite alloy has an aluminum content of less than 1.0 wt %.

4. The current collector according to claim 1, wherein the first heat-resistant ferrite alloy is selected from the group consisting of X8 CrAl 20-5, X8 CrAl 25-5 and X8 CrAl 14-4.

5. The current collector according to claim 1, wherein the second heat-resistant ferrite alloy is selected from the group consisting of X10 CrAlSi 18, X10 CrAlSi 24, X10 CrAlSi 13 and X7 CrTi 12.

6. The current collector according to claim 4, wherein the second heat-resistant ferrite alloy is selected from the group consisting of X10 CrAlSi 18, X10 CrAlSi 24, X10 CrAlSi 13 and X7 CrTi 12.

7. A fuel-cell pile comprising
  (i) at least one fuel cell provided with electrodes,
  (ii) at least one current collector comprising
    (a) a base body made from a first heat-resistant ferrite alloy which contains chromium and aluminum, and has an aluminum content of more than 2 wt %, the base body defining guide ducts for feeding fuels, and
    (b) at least one contact element made from a second heat-resistant ferrite alloy which contains chromium and has an aluminum content of less than 2 wt %, the at least one contact element being fastened facing away from the base body at the end of a ridge of the base body which bounds a side wall of a guide duct, the current collector being connected in an electrically conducting manner via the contact element to one of the electrodes of the fuel cell, wherein the contact element is connected to the electrodes via a contact layer and the contact layer completely encloses the contact element.

8. The fuel-cell pile according to claim 7, wherein the contact layer is made from a ceramic.

9. The fuel-cell pile according to claim 7, wherein the second heat-resistant ferrite alloy has an aluminum content of less than 1.5 wt %.

10. The fuel-cell pile according to claim 7, wherein the second heat-resistant ferrite alloy has an aluminum content of less than 1.0 wt %.

11. The fuel-cell pile according to claim 7, wherein the first heat-resistant ferrite alloy is selected from the group consisting of X8 CrAl 20-5, X8 CrAl 25-5 and X8 CrAl 14-4; and the second heat-resistant ferrite alloy is selected from the group consisting of X10 CrAlSi 18, X10 CrAlSi 24, X10 CrAlSi 13 and X7 CrTi 12.

12. A fuel-cell pile comprising
  (i) at least one fuel cell provided with electrodes,
  (ii) at least one current collector comprising
    (a) a base body made from a first heat-resistant ferrite alloy which contains chromium and aluminum, and as an aluminum content of more than 2 wt %, the base body defining guide ducts for feeding fuels, and
    (b) at least one contact element made from a second heat-resistant ferrite alloy which contains chromium and has an aluminum content of less than 2 wt %, the at least one contact element being fastened facing away from the base body at the end of a ridge of the base body which bounds a side wall of a guide duct, the current collector being connected in an electrically conducting manner via the contact element to one of the electrodes of the fuel cell, wherein the contact element is bonded to the base body by a coalesced material.

13. The fuel-cell pile according to claim 12, wherein the second heat-resistant ferrite alloy has an aluminum content of less than 1.5 wt %.

14. The fuel-cell pile according to claim 12, wherein the second heat-resistant ferrite alloy has an aluminum content of less than 1.0 wt %.

15. The fuel-cell pile according to claim 12, wherein the contact element is connected to the electrodes via a contact layer.

16. The fuel-cell pile according to claim 15, wherein the contact layer completely encloses the contact element.

17. The fuel-cell pile according to claim 15, wherein the contact layer is made from a ceramic.

18. The fuel-cell pile according to claim 17, wherein the contact layer completely encloses the contact element.

19. The fuel-cell pile according to claim 12, wherein the first heat-resistant ferrite alloy is selected from the group consisting of X8 CrAl 20-5, X8 CrAl 25-5 and X8 CrAl 14-4; and the second heat-resistant ferrite alloy is selected from the group consisting of X10 CrAlSi 18, X10 CrAlSi 24, X10 CrAlSi 13 X7 CrTi 12.

* * * * *